United States Patent [19]

Check

[11] 4,323,959
[45] Apr. 6, 1982

[54] POWER SUPPLY WITH RESONANT INVERTER CIRCUIT USING VARIABLE FREQUENCY CONTROL FOR REGULATION

[75] Inventor: Kenneth A. Check, Sunnyvale, Calif.

[73] Assignee: Hewlett-Packard Company, Palo Alto, Calif.

[21] Appl. No.: 183,532

[22] Filed: Sep. 2, 1980

Related U.S. Application Data

[63] Continuation of Ser. No. 904,368, May 10, 1978, abandoned.

[51] Int. Cl.³ .......................................... H02M 3/315
[52] U.S. Cl. .................................... 363/40; 363/28; 363/96; 363/136
[58] Field of Search .................................. 363/27–28, 363/39–41, 95–96, 74, 78, 135–136, 139

[56] References Cited

U.S. PATENT DOCUMENTS

| | | | |
|---|---|---|---|
| 3,311,809 | 3/1967 | Corey et al. | 363/135 |
| 3,443,196 | 5/1969 | Horner | 363/41 |
| 3,538,342 | 11/1970 | Jensen et al. | 363/135 |
| 3,573,597 | 4/1971 | Genuit | 363/28 |
| 3,818,306 | 6/1974 | Marini | 363/15 |
| 3,835,366 | 9/1974 | Homme | 363/135 |
| 3,863,140 | 1/1975 | Easter et al. | 363/15 X |
| 4,054,827 | 10/1977 | Reimers | 363/28 |
| 4,078,247 | 3/1978 | Albrecht | 363/96 |
| 4,079,305 | 3/1978 | Peterson et al. | 363/27 |

*Primary Examiner*—William M. Shoop
*Assistant Examiner*—Peter S. Wong
*Attorney, Agent, or Firm*—David A. Boone; Edward Y. Wong

[57] ABSTRACT

A power supply includes an inverter circuit comprising silicon controlled rectifiers which are driven by a variable frequency control signal. The frequency of the control signal is determined by monitoring the power output requirements of the power supply. Because of the continuous sinusoidal operation of the inverter, the supply generates a very low level of radio frequency interference (rfi).

1 Claim, 2 Drawing Figures

… … …

POWER SUPPLY WITH RESONANT INVERTER CIRCUIT USING VARIABLE FREQUENCY CONTROL FOR REGULATION

CROSS REFERENCE TO RELATED APPLICATION

This is a continuation of application Ser. No. 904,368, filed May 10, 1978, now abandoned.

BACKGROUND AND SUMMARY OF THE INVENTION

Switching power supplies have been increasingly utilized because of their high efficiency, their smaller size and their lower cost. To achieve power regulation, some of these switching supplies had a regulator and/or preregulator circuit which controlled the amount of energy applied to the inverter. Others achieved regulation by applying a fixed amount of energy to the inverter and varying the pulse width of the signal to the controlling devices of the inverter.

These prior supplies had the disadvantage that large amounts of rfi were generated by these switching elements. Also, these power systems were complex in both types of circuits and the number of circuit elements required.

In accordance with the preferred embodiment of the present invention, a fixed amount of energy is input to the inverter circuit. The frequency of the control signal to the inverter circuit is varied to achieve regulation. Because of the continuous operation of the inverter and the fact that small changes in the frequency of the driving signal to the inverter are all that were required to achieve regulation rather than the abrupt and discontinuous transitions used to control previous supplies, a much lower level of rfi is generated. This much lower level of electromagnetic interference (EMI) is a direct result of the absence of the high di/dt which occurs when an inverter is driven in the pulse width modulated mode. The lower level of di/dt also means there is less stress on the circuit components which are used. For example, in the preferred embodiment, the frequency of the driving signal is only varied between 18 KHz to 27 KHz to achieve power regulation. The resulting circuit is much less complex in both the number and types of circuits used, and hence is much more economical than previous supplies. Also, there is no requirement for other active components to achieve regulation since the output ripple is extremely low due to the almost pure sine wave output from the inverter.

DESCRIPTION OF THE PREFERRED EMBODIMENT

Figure 1:
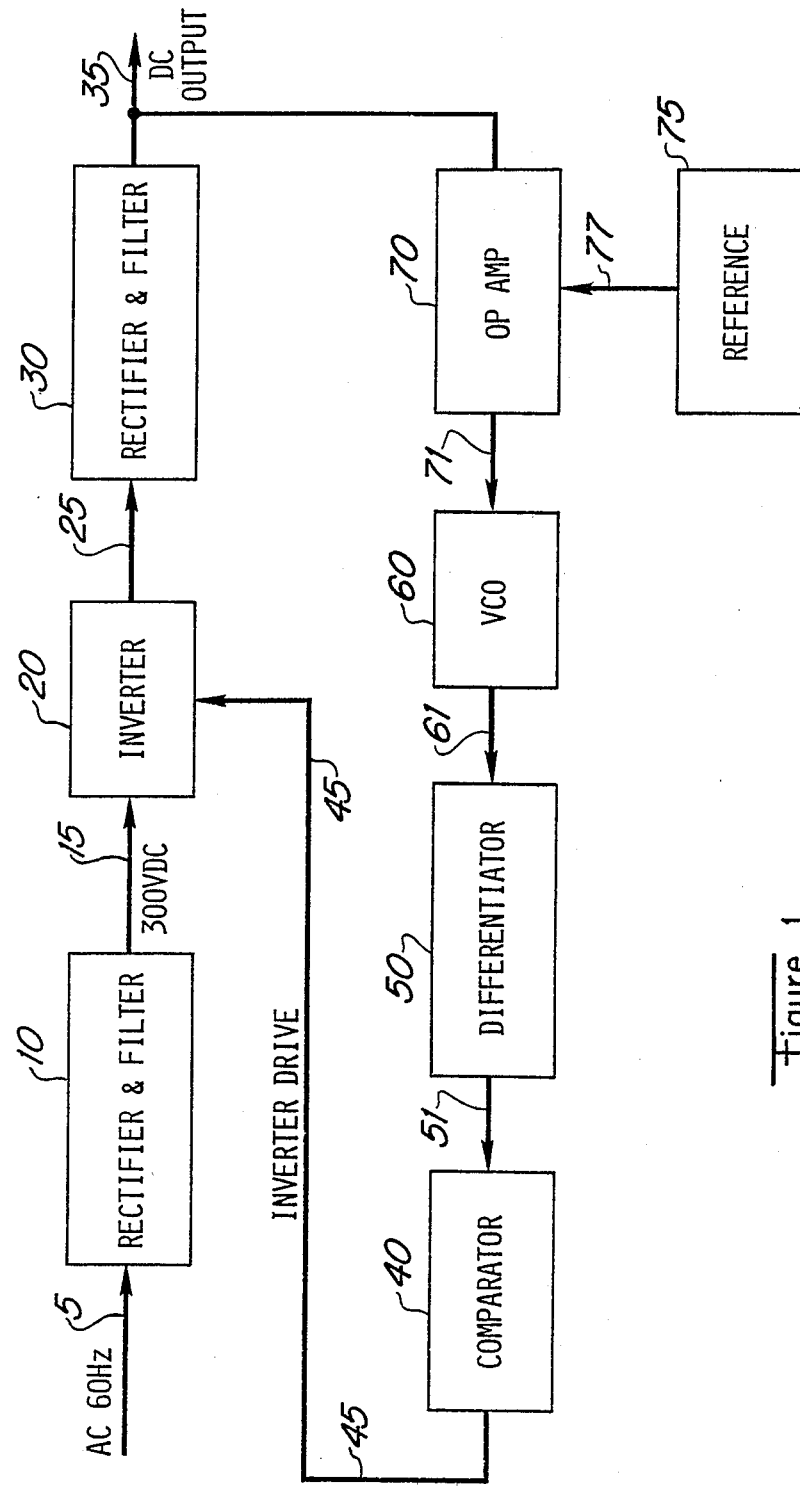
FIG. 1 is a block diagram of the preferred embodiment.

Referring to FIG. 1, there is shown a block diagram of the preferred embodiment. An AC line voltage received on a line 5 is input to a rectifier and filter circuit 10 which provides a 300 VDC signal on a line 15. This high voltage DC signal is input to an inverter 20 which produces a variable frequency sinusoidal signal on a line 25. The variable frequency sinusoidal signal is rectified and filtered by circuit 30 to produce the DC output voltage on a line 35. This signal on line 35 is the DC output of the power supply.

The frequency of the signal on line 25 and the power output on line 35 is determined by the inverter drive signal on line 45. This drive signal is provided in response to the power requirements being made on the supply. This is determined by monitoring the DC output on line 35. An operational amplifier 70 monitors both the DC output signal on line 35 and a reference signal on line 77 from reference circuit 75. As the power requirements at the output increase, so does the frequency of the inverter drive signal on line 45. The signal on line 71 is input to a Voltage Controlled Oscillator (VCO) 60 to produce the signal on line 61. The signal on line 61 is input to differentiator 50 which provides the signal on line 51 to comparator 40. Comparator 40 then provides the inverter drive signal on line 45 which is a modified square wave signal which causes inverter 20 to output a sinusoidal signal which varies between 18 KHz and 27 KHz.

Figure 2:
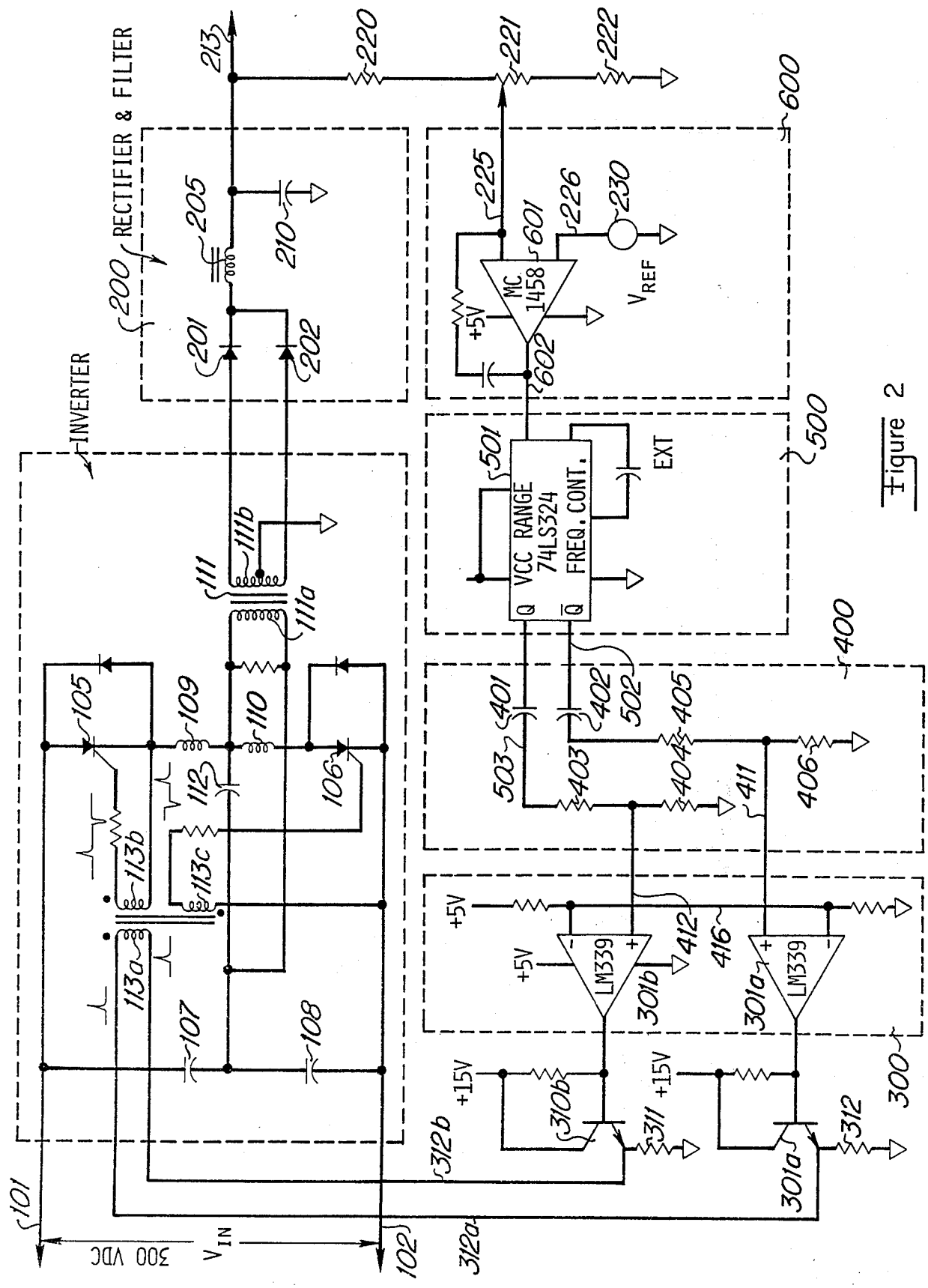
FIG. 2 is a schematic diagram of the inverter and inverter drive circuit of the preferred embodiment.

The operation of inverter 20 and the circuitry for providing the drive signal on line 45 is shown in FIG. 2. A 300 volt DC signal is input via lines 101 and 102. This voltage is divided by a divider circuit comprising capacitors 107 and 108. Capacitors 107 and 108 form one half of an inverter bridge circuit. The other half of the bridge comprises SCRs 105 and 106 and indicators 109 and 110. The output of the inverter bridge is input to inverter transformer 111.

On alternate half cycles, SCRs 105 and 106 are driven by the control circuits which drive transformer winding 113A. Pulses are alternately delivered to winding 113A from the circuits comprising transistors 310A and 310B. Because of the different winding sense of transformer windings 113B and 113C and the fact that transistors 310A and 310B drive opposite ends of winding 113A, SCRs 105 and 106 are fired on alternate half cycles.

When SCR 105 or 106 fires, it will put energy into its half of the inverter circuit, causing that half of the respective inverter inductor to resonate with the inverter capacitor 112 which is used by both halves of the inverter. The firing of SCR 105 will cause the LC tank circuit of inductor 109 and capacitor 112 to resonate. At the end of that half cycle, the field will collapse and SCR 105 will turn off.

In the other half cycle, SCR 106 will be turned on and will cause capacitor 110 to be charged in the opposite polarity and resonate with inductor 110. This resonate circuit described above generates a simple sine wave across capacitor 112 and the inverter load, i.e., inverter transformer winding 111a which is in parallel with capacitor 112.

Therefore, with a sine wave input to winding 111a, the inverter transformer output voltage across the winding 111b is dependent on the preselected winding turns ratio of windings 111a and 111b. This inverter output voltage is full wave rectified by diodes 201 and 202 and filtered by the filter circuit comprising inductor 205 and capacitor 210 to provide the supply output on line 213.

Control of the energy provided to the inverter circuit is provided as follows. The output voltage on line 213 is sensed and divided down by resistor 220, variable resistor 221, and resistor 222. The signal on line 225 is input to operational amplifier 601 where it is compared to the preselected reference voltage provided on line 226 by a reference supply 230.

Depending on whether the output voltage is determined to be above or below the output voltage desired, the energy input to the inverter will be decreased or increased, respectively. This is accomplished by causing the inverter to oscillate at a greater frequency and hence increase the amount of energy coupled to inverter winding 111a or to oscillate at a lesser frequency and hence decrease the energy input to inverter transformer 111.

Specifically operational amplifier 601 provides a signal on line 602 which controls VCO 500. In the preferred embodiment, VCO 500 is simply an integrated circuit such as a 74LS324 or the like which is manufactured by Texas Instruments and others. VCO 501 provides the square wave signals on lines 502 and 503. The signals on lines 502 and 503 are identical except that they are 180° out of phase.

Since it is desirable to use a narrower pulse than the square wave which is generated on lines 502 and 503, these signals are processed by the differentiation network comprising capacitors 401 and 402 and resistors 403, 404, 405, and 406. These narrow pulses produced on lines 411 and 412 are input to comparators 301A and 301B respectively, which compares them to the reference signal on line 416.

The outputs of comparators 301A and 301B are amplified by the amplifier circuits comprising transistors 310A and 310B. The amplified pulses produced on lines 312A and 312B drive opposite ends of winding 113A. As described above, the fact that these pulses drive opposite ends of winding 113A plus the different winding sense of windings 113B and 113C, results in the alternate activation of SCR 105 and SCR 106. Note that when a positive pulse is output from the terminal of winding 113B which is coupled to the gate of SCR 105, a negative pulse will be produced at terminal of winding 113B which is coupled to the gate of SCR 106. The opposite phenomena occurs when the positive pulse is produced from 113C to turn on SCR 106. These occur because of the opposite winding sense, but are of no effect since the SCRs only respond to positive pulses of their gates.

Comparators 301A and 301B are similar to the LM339 comparators or the like which are manufactured by National Semiconductor and others. The result of this signal processing is that two pulses of approximately 8 microseconds duration and 180° out of phase are produced. The frequency as described above is at some preselected base frequency and varies above or below that depending upon whether the output voltage on line 213 is sensed to be below or above that desired.

I claim:

1. A switching power supply circuit comprising:
   input means for receiving a first alternating current (AC) signal;
   first rectifying and filtering means coupled to said input means for providing a first direct current (DC) signal in response to said first AC signal;
   inverter means generating minimal radio frequency interference (RFI) coupled to said first rectifying and filtering means for providing a second AC signal having a substantially sinusoidal waveform in response to the first DC signal and to an inverter control signal, said inverter consisting of a pair of SCR's alternately triggered and negatively biased;
   inverter control means coupled to said inverter means for providing said inverter control signal and for varying the frequency of said inverter control signal in response to an indication of a desired power output from said inverter, said inverter control means further comprising:
   a first comparator means for providing a first comparison signal in response to a comparison of a DC output signal with a preselected reference signal;
   an oscillator coupled to said first comparator means for providing an oscillator output signal in response to said first comparison signal;
   a differentiator means coupled to said oscillator for simultaneously providing a negative differentiated pulse to one and a positive differentiated pulse to the other of said pair of SCR's via a transformer in response to said oscillator output signal; and
   means for providing said inverter control signal in response to said oscillator output signal; and
   second means coupled to said inverter means for providing said DC output signal in response to said second AC signal.

* * * * *

UNITED STATES PATENT AND TRADEMARK OFFICE
CERTIFICATE OF CORRECTION

PATENT NO. : 4,323,959
DATED : April 6, 1982
INVENTOR(S) : Kenneth A. Check

It is certified that error appears in the above—identified patent and that said Letters Patent is hereby corrected as shown below:

Column 2, line 28, "indicators" should read -- inductors --

Signed and Sealed this

Twenty-ninth Day of March 1983

[SEAL]

Attest:

GERALD J. MOSSINGHOFF

Attesting Officer　　Commissioner of Patents and Trademarks